150-169. SR
07-11-72 XR 3,676,866

United States Patent [15] 3,676,866
Freedman [45] July 11, 1972

[54] OPTICAL IMAGE DATA PROCESSING SYSTEM

[72] Inventor: Morris D. Freedman, Southfield, Mich.
[73] Assignee: The Bendix Corporation

[22] Filed: Jan. 6, 1971
[21] Appl. No.: 104,406

[52] U.S. Cl. .......................340/173 LT, 315/84.5, 328/123, 340/172.5, 340/173 LM, 350/169
[51] Int. Cl. ..................G11c 5/00, G11c 11/32, G11c 19/00
[58] Field of Search ..................340/173 LT, 173 LM, 172.5; 350/169; 328/123; 315/84.5

[56] References Cited

UNITED STATES PATENTS 3,106,699 10/1963 Kamentsky .........................340/172.5
3,196,392 7/1965 Horwitz ..........................340/172.5 X
3,492,652 1/1970 Van Heerden......................340/172.5

*Primary Examiner*—Bernard Konick
*Assistant Examiner*—Stuart Hecker
*Attorney*—Fisher & Schmidt, William F. Thornton and Plante, Hartz, Smith and Thompson

[57] ABSTRACT

An optical image data processing system incorporating a processor that includes arrays of image storage devices each having write, store and read modes of operation and each being capable of inverting an image. The image storage devices are coupled by optical networks so that each receives the proper illumination and in a programmed sequence determined by a controller which determines the operating mode of the devices. One array of the devices is capable of shifting the optical image to facilitate analyzing the optical image for different information while another array can store this information.

16 Claims, 4 Drawing Figures

INVENTOR.
Morris D. Freedman
BY
Fisher & Schmidt
ATTORNEYS

INVENTOR.
Morris D. Freedman
BY
Fisher & Schmidt
ATTORNEYS

OPTICAL IMAGE DATA PROCESSING SYSTEM

This invention relates to improvements in optical image data processing systems.

Optical image data processing, particularly parallel processing, has generally required rather complex and inefficient systems. The complexity and bulkiness along with the lack of versatility has inherently restricted the applications of the systems. Then too, optical loses can render a system erratic and further inhibit the application of the systems.

Accordingly, a unique optical image data system is contemplated employing simplified optics and incorporating novel provision for substantially improving the system's signal-to-noise ratio so as to overcome optical losses.

Also contemplated is an optical image data system that in a new and different way achieves parallel processing.

Other objectives include the provision of an optical image data processing system capable of inverting images to facilitate the data determination; an image data processing system capable of shifting images relative to an optical reference to facilitate obtaining data from the optical image; and an optical image data processing system incorporating electronic image storage devices capable also of providing amplification.

A further objective is an optical image data processor that employs an array of electronic storage devices each capable of inverting and/or shifting image data so as to enable the processor to perform logic operations.

Still another objective is an optical image data processor that employs an array of electronic storage devices arranged in parallel so as to store partial data results.

The foregoing and other objects and advantages of the invention will become apparent from the following description and from the accompanying drawings in which.

Figure 1:
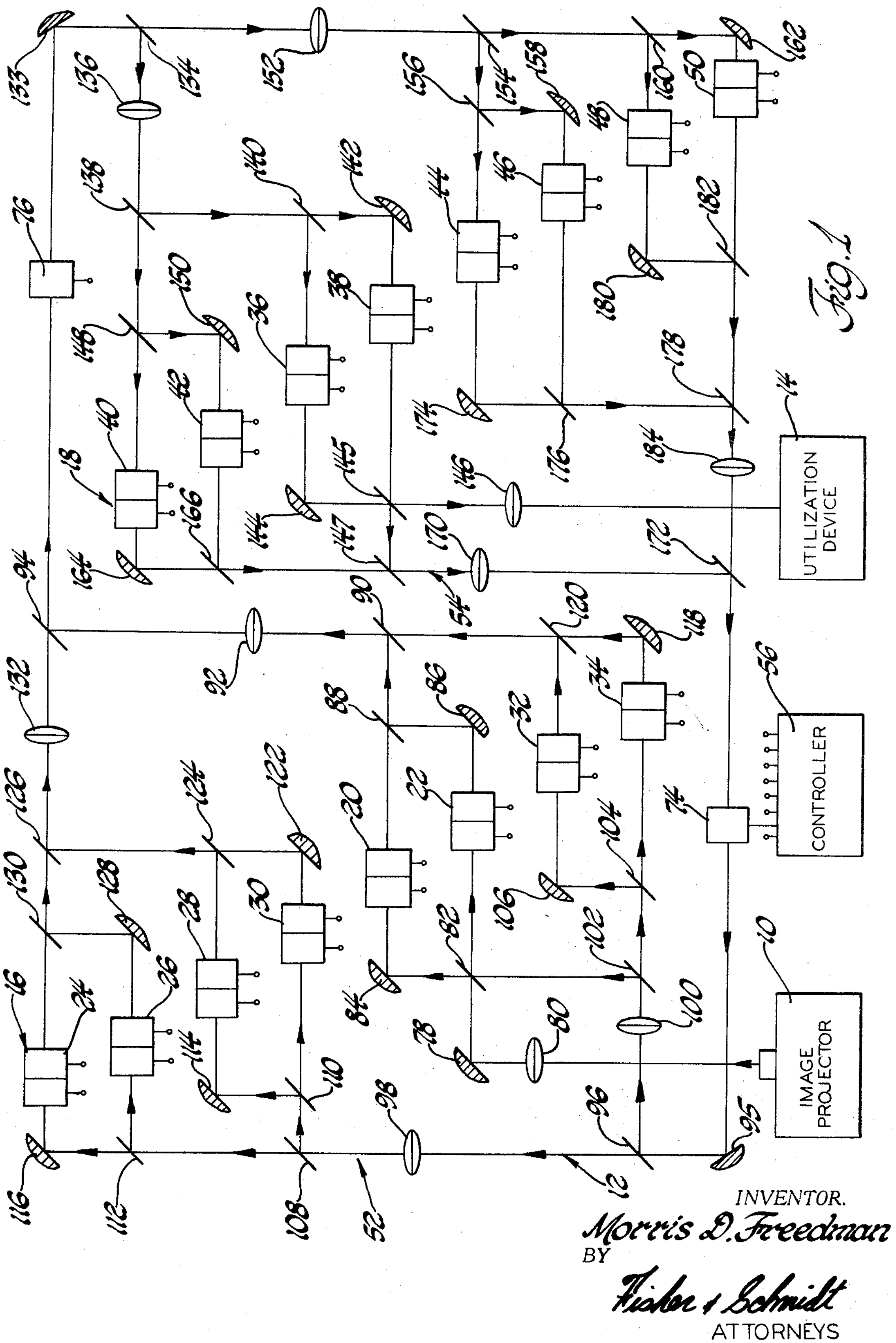
FIG. 1 is a schematic diagram of an optical image data system incorporating the principles of the invention.

Referring first to FIG. 1, the optical input is derived from a source, such as a live scene or an image projector 10 of any commercially available type utilizing film, slides or the like to provide the optical image to be analyzed by an optical image data processor designated generally at 12. This optical image data processor 12 in a way to be described extracts data from the optical image and in so doing performs logic functions after which the data at the optical output of the processor 12 is supplied to a utilization device 14 which may be some type of recorder employing a light sensitive film, a viewing screen or something similar.

Continuing to refer to FIG. 1, the image data processor 12 in the depicted embodiment has rows at 16 and 18 of arrays of image storage devices. Those in row 16 are assigned the numerals 20–34, and those in row 18 are assigned numerals 36–50. The row 16 is optically coupled between the image projector 10 and the row 18 by an optical network 52. In a similar way the row 18 is optically coupled between the row 16 and the utilization device 14 by an optical network 54. As will be explained more in detail, the arrays of image storage devices 20–34 and 36–50 are operated in accordance with a predetermined scheme or program by a controller 56, which may be of any well-known kind and can be a computer programmed to supply operating power to the image devices when required. The row arrangement enables parallel processing to be effectively carried out and will become more apparent as the system is described.

The individual image storage devices 20–50, may be any of the usual types capable of converting an optical image to an electronic counterpart image and then storing this electronic image until readout is wanted af which time the electronic image is converted back to an optical image. One such device is disclosed in my U.S. application, Ser. No. 861,748 filed Sept. 29, 1969, now U.S. Pat. No. 3,609,433, and titled "A Proximity-focused Image-storage Tube." Since all of these devices 20–50 operate the same, only the one denoted at 20 and shown in detail in FIG. 2 will be briefly described for purposes of understanding the present invention. If further details are wanted, reference can be made to the mentioned application.

Figure 2:
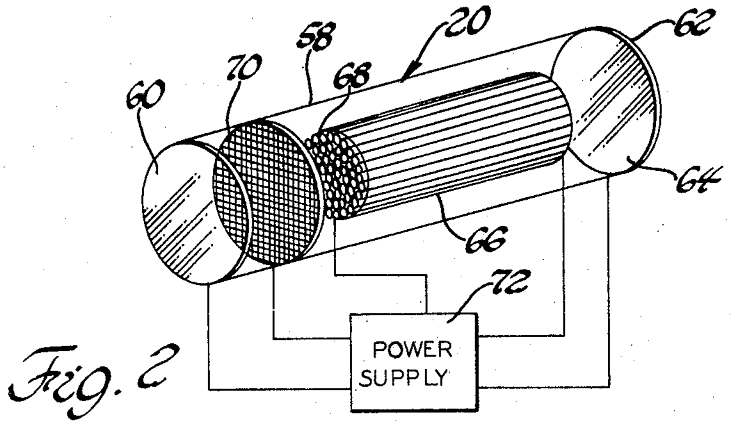
FIG. 2 is a schematic perspective view of a proximity focused image storage device utilized in the FIG. 1 system.

In FIG. 2, the numeral 58 denotes an evacuated envelope. At one end of the envelope 58 is positioned a photocathode 60 and at the other end a face plate 62 which has an inside phosphor readout surface 64. Between the photocathode 60 and the face plate 62 is appropriately positioned an array of tubes or as they will be referred to a passageway array 66 through which electrons can pass and which have their walls formed of a material so as to provide a secondary source of electrons and the desired electron multiplication for enhancing the signal-to-noise ratio of the system. Each end of the passageway array 66 is provided with a metallic conductive coating and additionally a charge storage surface is provided at 68 on the input side of the passageway array 66. Between this storage surface 68 and the photocathode 60 is positioned a collector electrode 70. The voltage differentials required for operating the image storage device 20 are provided by a power supply 72 which is in turn in a way to be explained controlled by the controller 56.

During operation of the image storage device 20, appropriate voltage differentials are established by the power supply 72 so that initially the device 20 is primed by creating a uniform distribution of electrons on the charge storage surface 68. This may be done by illuminating the photocathode 60 with a uniform intensity floodlight. The device 20 is in this way prepared for the write mode of operation, and any desired image can be stored by projecting the image on the photocathode 60 with the power supply 72 adjusted to provide the proper operating potentials. In operation, electrons are emitted by the photocathode 60 and strike the charge storage surface 68 to create a storage pattern corresponding to the image. During a positive write operation, the electrons emitted by the photocathode 60 strike the charge storage surface 68 with sufficient energy to cause the emission of one or more secondary electrons so that the struck portion of the surface 68 becomes more positively charged than it had been previously. Contrariwise, during a negative write operation, electrons have a smaller acceleration with insufficient energy to cause the emission of secondary electrons. Consequently, the struck portion of the surface 68 will become more negatively charged than it had been. During this negative write operation the voltage on the collector electrode 70 is maintained so that the proper electron velocities are developed without defocusing the device 20.

The voltages maintained on the output side of the passageway array 66 and on the phosphor readout surface 64 are selected so as to isolate the charge storage surface 68 from the phosphor readout surface 64.

To initiate the read mode of operation, the potentials are again adjusted by the power supply 72 so that the electrons will proceed through the passageway array 66 and cause the emission of secondary electrons. Electrons then exit the passageway array 66 with a higher velocity than when entering and strike the phosphor readout surface 64 so as to generate the visually observable output optical image which will correspond to the stored charge pattern. Following a positive write when a positive charge pattern is stored on the surface 68, the output image will correspond exactly to the stored charge pattern but after a negative write when a negative charge pattern is stored, the output image will correspond inversely to the stored charge pattern. For example, if during a positive write the output image appeared light with a dark background then during a negative write there will be an inversion with the image becoming dark and the background light.

To erase the device 20 the potentials are again adjusted by the power supply 72 and the photocathode 60 is illuminated with a uniform intensity floodlight which will cause a high density beam of electrons to be accelerated toward the storage surface 68. Thereafter, the device 20 is reprimed and prepared for another write operation.

Because the electron multiplication through the passageway array 66 is adjustable by changing the potentials maintained at the opposite ends thereof, the gain can be correspondingly varied to intensify the image and thus minimize image degradation. If further image intensification is wanted, each of the devices 20–50 can have positioned at their input side an image intensifier; e.g., one of the Bendix Corporation's Channeltron electron multiplier image intensifiers, which are shown and described in the Goodrich et al. U.S. Pat. No. 3,128,408 and which would have the output thereof coupled by a fiber optic faceplate or the like (not shown) to the input of the image storage devices. Two such image intensifiers are, as shown in FIG. 1, employed by the processor 12 at 74 and 76 between the two optical networks 52 and 54.

The optical networks 52 and 54 are shown in FIG. 1 to be side by side but can be arranged one above the other so that the optical image in light form, as it will be referred to in this part of the description, can be more efficiently transferred by way of the image intensifiers 74 and 76 between the two optical networks 52 and 54.

For explanatory purposes, it will be assumed that the various image storage devices 20–50 are operational to effect the light transfer in each of the described parallel paths. Also each reflecting mirror and each focusing lens, which is adjusted to the proper focal length, are conventional and the beam splitters and beam combiners are of the semi-transparent prism type or any other type capable of respectively splitting incoming light equally into two paths and combining light from two paths into a single path. It should be kept in mind that some of the combining and splitting functions may not be used during the actual data determination; this being determined by the paths utilized during a particular data determination.

Considering first the structure of the optical network 52, light from the image projector 10 is transferred to the image storage devices 20 and 22, which serve as input buffers, by way of a focusing lens 80 and a reflecting mirror 78 to a beam splitter 82. Hence, during write the light from the beam splitter 82 will proceed half directly to the image storage device 22 and half by way of a reflecting mirror 84 to the image storage device 20.

During readout the light is transferred from the image storage device 22 by way of a reflecting mirror 86 to a beam combiner 88. This beam combiner 88 combines the light from the reflecting mirror 86 and also the light from the image storage device 20. This combined light is then transferred through another beam splitter 90, a focusing lens 92, and a beam combiner 94 to the image intensifier 76 and then to the optical network 54.

After data determination, light is transferred to the optical network 52 from the optical network 54 by way of the image intensifier 74 and a reflecting mirror 95 to a beam splitter 96, and then both to a focusing lens 98 and to a focusing lens 100. Light from the lens 100 is transferred through beam splitters 102 and 82 so as to proceed to the image storage devices 32, 34, 20 and 22. The light from the beam splitter 104 is transferred by way of a reflecting mirror 106 to the image storage device 32 and directly to the image storage device 34. The light from the lens 98 is transferred by a beam splitter 108 to another beam splitter 110 and also to a beam splitter 112. The light proceeding by way of the beam splitter 110 is transferred one-half directly to the image storage device 30 and one-half by way of a reflecting mirror 114 to the image storage device 28. Light from the beam splitter 112 is transferred one-half directly to the image storage device 26 and one-half by way of a reflecting mirror 116 to the image storage device 24. This arrangement is such that each of the image storage devices 20, 22, 24, 26, 28, 30, 32 and 34 will receive the same amount of light and in the storage mode function as a memory.

When readout is wanted from the memory the light from the image storage device 34 is transferred by way of a reflecting mirror 118 to a beam combiner 120. The light from the image storage device 32 is also transferred to the beam combiner 120. Then the combined light is transferred by way of the beam combiner 90, the focusing lens 92, the beam combiner 94 and the image intensifier 76 to the optical network 54. The light from the image storage device 30 is reflected by a reflecting mirror 122 to a beam combiner 124, which combines this light from the image storage device 28 and transfers it to a beam combiner 126. The light from the image storage device 26 is transferred by way of a reflecting mirror 128 to a beam combiner 130 where this light is combined with that from the image storage device 24 and then further combined by the beam combiner 126 before being transferred by a focusing lens 132 and the beam combiner 94 to the optical network 54.

The optical network 54 has a reflecting mirror 133 and a beam splitter 134 which splits the incoming light from the image intensifier 76 with part of the light proceeding by way of a focusing lens 136 to a beam splitter 138. Part of this light is then transferred to a beam splitter 140 where half is transferred to the image storage device 36 and half is transferred to the image storage device 38 by way of a reflecting mirror 142. The light from the image storage device 36 is reflected by a reflecting mirror 144 to a beam splitter 145, which splits the light from either of the image storage devices 36 or 38 and then transfers part to the utilization device 14 by way of a focusing lens 146 and part to the beam combiner 147. The other half of the light from the beam splitter 138 proceeds by way of another beam splitter 148 to the image storage device 40 and by way of a reflecting mirror 150 to the image storage device 42.

The other portion of the light from the beam splitter 134 is transferred through a focusing lens 152 to a beam splitter 154 and then with half proceeding by way of a beam splitter 156 directly to the image storage device 44 and indirectly to image storage device 46 by way of a reflecting mirror 158. The other half of the light from the beam splitter 154 is transferred through a beam splitter 160 with half of the light proceeding directly to the image storage device 48 and half by way of a reflecting mirror 162 to the image storage device 50.

The image storage devices 40, 42, 44, 46, 48 and 50 perform as image shifters. To carry out this function the optical network 54 is constructed so that the optical image for each shifter is offset in one of six different hexagonal directions. These directions are selected because of the alignment of the tubes in the passageway array 66; e.g., as denoted at 165 in FIG. 4. Thus, the image is shifted as will be explained one resolution element in the direction the particular device, in effect, is offset from what will be referred to as an optical reference or the position prior to the offset. The image storage devices 36 and 38 serve as outputs to the utilization device 14 and also can participate in the data determination as will be discussed.

During readout, the light from image storage device 40 is reflected by a reflecting mirror 164 to an image combiner 166, which combines the light from the image storage device 42 and thereafter this combined light proceeds through the beam combiner 147, a lens 170, a beam combiner 172 and through the image intensifier 74 to the optical network 52. The light from the image storage device 44 proceeds by way of reflecting mirror 174 to an image combiner 176 where it is combined with the light from the image storage device 46. This combined light is then transferred to an image combiner 178. The light from the image storage device 48 is reflected by a reflecting mirror 180 to an image combiner 182. The image combiner 182 combines the light from the image storage device 50 with that from the image storage device 48 and transfers it to the image combiner 178. The light from the image combiner 178 now proceeds by way of a focusing lens 184 to the image combiner 172 and then to the optical network 52.

Figures 3, 4:
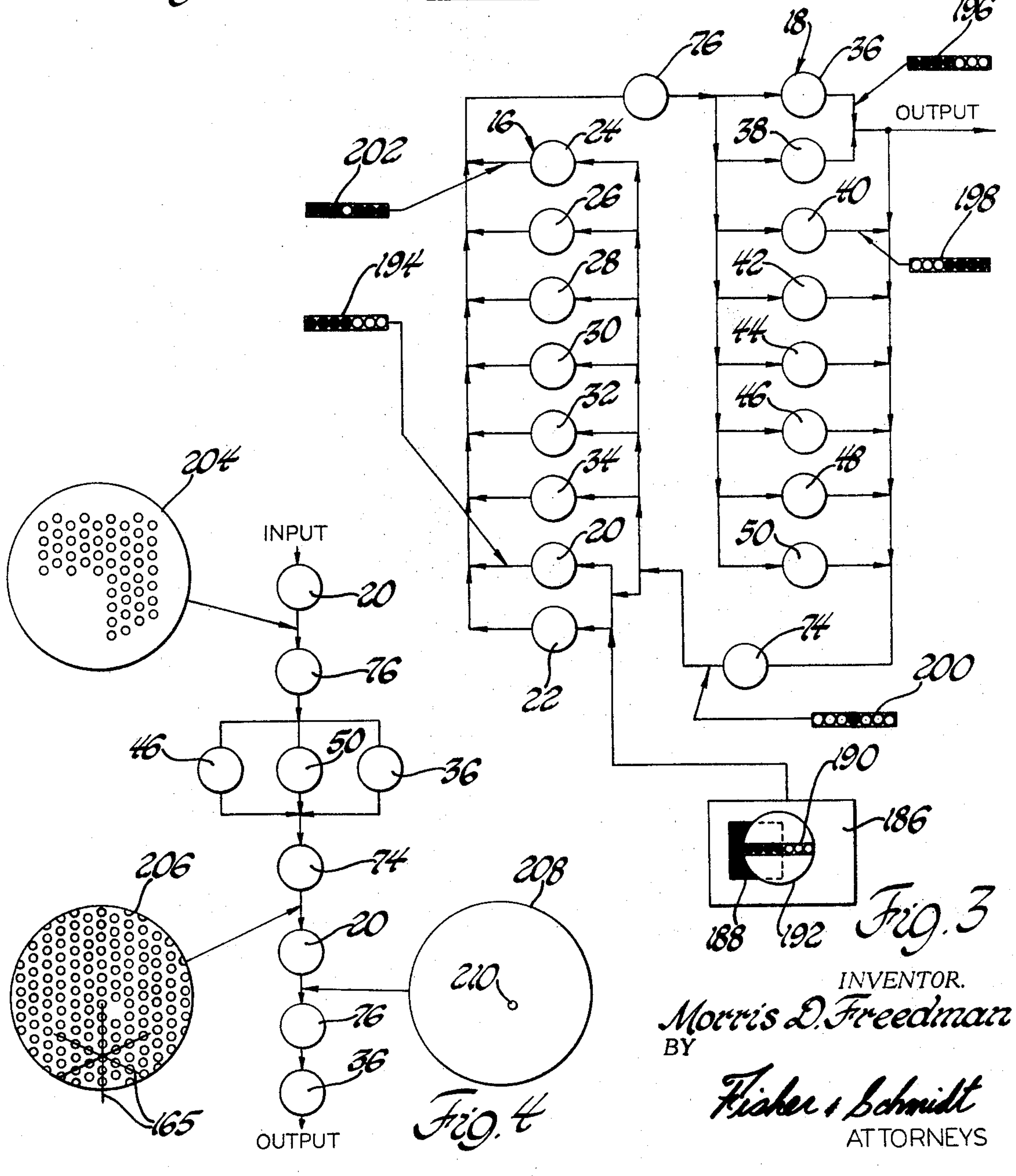
FIG. 3 is a schematic diagram of the data flow when detecting edges with the FIG. 1 system.
FIG. 4 is a schematic diagram of the data flow when detecting an inside corner with the FIG. 1 system.

Describing the operation of the FIG. 1 system during data determination, reference is made to the FIG. 3 flow diagram.

It will be assumed that the projector 10 has a slide 186 with an image 188 and that the right edge of the dark image 188 is to be detected by analyzing a line element of the image as designated generally as 190. It should be kept in mind that each line element of the image 188 extending in the same direction such as element 190 in FIG. 3 and within a circle 192 representing the photocathode 60 of the image storage devices will be substantially the same. This element 190 of the image 188 is therefore transferred by the optical network 52 to the input of the image storage device 20. The controller 56 is set for this analysis and establishes the image storage device 20 in the positive write mode. Next, the image storage device 20, which has been storing the image element 190, is changed to the read after positive write mode so that in the output of the image storage device 20 an image element 194 will be developed and appear as illustrated. For exemplary purposes the im'ge element 194 is shown with four dark dots and three light dots which correspond to those of the tubes of the device's passageway array 66 when the element 190 of the dark image 188 is being analyzed and hence is the electronic image that is transferred to the device's face plate 62.

At the time that the device 20 is set in its read after positive write mode, the image intensifier 76 is turned on, the image storage device 40 is set in its negative write mode and the device 36 is set in its positive write mode. Consequently, the image element 194 is transferred by the optical network 52 to the image intensifier 76 and then by the optical network 54 to both of the inputs of the devices 36 and 40. After this step, the device 20 and the image intensifier 76 are turned off so that there is no further optical coupling in this direction. With both of the devices 36 and 40 next placed in their storage mode of operation, to initiate readout, they are respectively set in their read after positive write and read after negative write modes. Hence, an image element 196 will be developed at the output of the device 36 and will, as depicted, be the same as the image element at 194 at the output of the device 20. An image element displayed at 198 will be formed at the output of the device 40 and will be shifted to the left and inverted as can be seen by comparing the image elements 194 and 198; i.e., instead of four dark dots on the left there are four dark dots on the right side of the image element 198.

Next, the image intensifier 74 is rendered operative by the controller 56 and the image device 24 set in its negative write mode of operation. It will be noted that at the output of the image intensifier 74, the combining by the optical network 54 of the image element 196 and the shifted image element 198 will result in an image element 200 with only the center dot being dark. Because the image storage device 24 is operated in the negative write mode, the complement or inverse of the image element 200 will be stored by the image storage device 24 when transferred thereto by the optical network 52 from the optical network 54. Consequently, after operating the image storage device 24 in its read after negative write mode, there will be developed at the output an image element 202 which will have the center dot light instead of dark and the opposite of the image element 200. This image element 202 represents the location of a right-hand edge. Similarly, all other right edge line elements will have a single light dot. The image element 200 therefore is equivalent to the logic OR function of the image elements 196 and 198; i.e., the device 24 will see light from either the image element 196 from the device 36 or the shifted image element 198 from the device 40. Consequently, the only time that the image element 200 will have the single dark dot is when there is a right-hand edge that appears as depicted by the image element 194.

To effect the readout from the processor 12 the controller 56 is operative to turn off devices 36 and 40 and the image intensifier 74, the image storage device 24 is set in its read after negative write mode, the image intensifier 76 is turned on, and the image storage device 36 is placed in its positive write mode. This causes the optical network 52 and 54 to transfer the image element 202 to the device 36. The device 24 and image intensifier 76 now are turned off and the device 36 is set to operate in its read after positive write mode so that the image element 202 will be transferred by the optical network 54 to the utilization device 14.

One or more of the image storage devices 24–34 can be operated to store the image element 194 for later readout or for further processing in the event partial results are stored for use during later stages of processing. As will be appreciated, this operation of the processor 12 is similar to that of a digital computer where information is stored in registers, read out for processing, and then stored again in the same registers overwriting data which is no longer required.

To detect an inside corner with the FIG. 1 system the controller 56 is programmed for the sequence of events depicted in the FIG. 4 flow chart. In FIG. 4 the image is projected by the optical network 52 onto the input of the image storage device 20 which is set in the positive write mode. This image is stored until the image storage device 20 is placed in the read after positive write mode by the controller 56. At this same time the image intensifier 76 is turned on and the image storage devices 46 and 50 are set in their negative write mode and the image storage device 36 in its positive write mode. The image at the output of the image storage device 20, which will appear as at 204 and which will be assumed for demonstration purposes to be a direct representation of a light image on a dark background, will be transferred by the optical networks 52 and 54 to the devices 46, 50 and 36. After the image 204 is stored by the devices 46, 50 and 36, the image storage device 20 and the image intensifier 76 are turned off.

To read out the stored image, the image storage devices 46 and 50 are set in the read after negative write mode and the image storage device 36 is placed in the read after positive write mode. The image intensifier 74 is turned on and the image storage device 20 is placed in the negative write mode. The image storage devices 46 and 50 both shift the image and also invert it so that it becomes dark with a light background. The image storage device 36 stores the image directly without shifting or inverting it so that the image still has a dark background. All of these outputs, from the devices 46, 50 and 36 when read out are supplied by the optical networks 52 and 54 to the input of the image storage device 20. To determine whether an inside corner exists, the image storage device 46 shifts the image one resolution to the left and the image storage device 50 shifts the image one resolution down, both directions being as viewed in FIG. 4. This will result in a dark area at the inside corner of the image 204 and is shown as an image 206 depicted at the input to the image storage device 20. To isolate the dark area of the image 206 the image storage device 20 is set in the negative write mode when the devices 46, 50 and 36 are read out and the image intensifier 74 is on. Next, the image intensifier 74 and the image storage devices 46, 50 and 36 are turned off and the image storage device 20 is set in the read after negative write mode. The image intensifier 76 is turned on and the image storage device 36 is set in the positive write mode. Therefore, the optical networks 52 and 54 will transfer to the input of the image storage device 36 an image as shown at 208 with a light dot 210 representing the dark area in the image 206. This is because of the inversion and thus can provide more positive detection of the inside corner. By next placing the image storage device 36 in the read after positive write mode and turning off the image intensifier 76 and the image storage device 20, the transfer can be made of this inside corner detection to the output utilization device 14.

As will be appreciated the FIG. 1 image data processor has many diverse applications which will be readily apparent to those versed in the art. This is done with image storage devices that can provide gain and if additional gain is required, image intensifiers can be included. This minimizes image degradation so as to enhance not only the efficiency but the number of applications in which the processor can be utilized. By utilizing the image storage devices 40–50 as shifters, the described isolation of features and data can be facilitated. Then too, this information can either be read out directly or stored in the devices 23–34 for later processing. Furthermore, the uncomplicated optical networks 52 and 54 afford parallel paths for the optical image transfer so that parallel processing is efficiently achieved. As can now also be appreciated, each optical image is composed of a series of dots which are processed in parallel.

What is claimed is:

1. In an image data processing system; the combination of an optical image generating source; utilization means; and means processing the optical image from the source and developing data relating to the optical image for supply to the utilization means; the processing means including a plurality of image processing devices each having plural operating modes including a write mode wherein the optical image when supplied to the input thereof is converted to a corresponding electronic image, a memory mode wherein the electronic image is stored, and a read mode wherein the electronic image is converted back to an optical image and supplied to the output thereof and each being also selectively operable to invert the optical image, one of the image processing devices being also adapted when operative to shift the optical image in a certain direction relative to a predetermined reference position, the plurality of image processing devices having a predetermined physical arrangement and spacing relative to each other, means optically coupling the plurality of image processing devices in parallel so that the inputs thereof receive in accordance with a predetermined scheme a certain illumination in a certain sequence, and controller means rendering the image processing devices operative to establish the plural operating modes for each image processing device in accordance with the predetermined scheme so as to effect the sequential transfer of the optical image therebetween thereby developing the data relating to the optical image.

2. In an image data processing system, the combination of an optical image generating source; utilization means; and means processing the optical image from the source and developing information relating to the optical image for supply to the utilization means; the processing means including a plurality of image processing devices each having plural operating modes including a write mode wherein the optical image when supplied to the input thereof is converted to a corresponding electronic image, a memory mode wherein the electronic image is stored, and a read mode wherein the electronic image is converted back to the optical image and supplied to the output thereof, the plurality of image processing devices having a predetermined physical arrangement and spacing relative to each other, optical means optically coupling the plurality of image processing devices in parallel so that the inputs thereof receive in accordance with a predetermined scheme a certain illumination in a certain sequence and controller means rendering the image processing devices operative to establish the plural operating modes for each image processing device in accordance with the predetermined scheme so as to effect the sequential transfer of the optical image therebetween thereby developing data relating to the optical image.

3. An image data processing system as described in claim 2, wherein one of the plurality of image processing devices is also operable to invert the optical image.

4. An image data processing system as described in claim 2, wherein one of the plurality of image processing devices is so constructed as to shift the optical image in a certain direction relative to a predetermined reference position.

5. An image data processing system as described in claim 2, wherein the plurality of image processing devices are each selectively operable to invert the optical image.

6. An image data processing system as described in claim 5, wherein the plurality of image processing devices include an array of image processing devices each device so constructed as to shift the optical image in one of a plurality of directions from a predetermined reference position.

7. An image data processing system as described in claim 2, wherein the plurality of image processing devices include a memory array of the image processing devices arranged to serve as a memory for the processing means.

8. An image data processing system as described in claim 7, wherein the plurality of image processing devices are each selectively operable to invert the optical image and also include a shifter array of the image processing devices each device so constructed as to shift the optical image in one of a plurality of directions from a predetermined reference position.

9. An image data processing system as described in claim 8, wherein in accordance with the predetermined physical arrangement and spacing of the image processing devices, the memory array and the shifter array are arranged each in rows, one of the image processing devices performs as an input and another of the image processing devices performs as an output and the optical means transfers the optical image successively through the input processing device, the shifter array and then selectively either to the memory array for later readout by way of the output image processing device to the utilization means or directly by way of the output image processing device to the utilization means.

10. An image data processing system as described in claim 9, wherein the optical means includes optical image intensifying means for preventing degradation of the optical image during transfer.

11. An image data processing system as described in claim 9, wherein the optical coupling means includes optical networks, one for coupling the image processing devices in the shifter array in parallel and another for coupling the image processing devices in the memory array in parallel and for making the transfer of the optical image therebetween and between the source and the utilization means.

12. An image data processing system as described in claim 2, wherein the plurality of image processing devices includes a shifter array of the image processing devices each so constructed as to shift the optical image in one of a plurality of directions from a predetermined reference position and in accordance with the predetermined physical arrangement and spacing of the image processing devices, the shifter array is arranged in a row and the optical coupling means couples the image processing devices in the shifter array in parallel for transferring the optical image therethrough from the source and to the utilization means.

13. In an optical image data processor; the combination of means inverting and displacing an optical image relative to a predetermined reference position so as to algorithmically process the optical image to obtain desired information therefrom; the inverting and displacing means including a plurality of electronic image processing devices each having write, memory, and read operating modes in which the optical image is respectively converted to an electronic image, stored, and converted back to optical image; optical means optically coupling the plurality of electronic image processing devices so that the inputs thereof receive in accordance with a predetermined scheme a certain illumination in a certain sequence; and controller means establishing the operating modes for the plurality of image processing devices in accordance with the predetermined scheme so as to obtain the desired data from the optical image.

14. An optical image data processor as described in claim 13, wherein the plurality of electronic image processing devices include a shifter array of the image processing devices each being so constructed as to shift the optical image in one of a plurality of directions from the predetermined reference position.

15. An optical image data processor as described in claim 14, wherein the plurality of electronic image processing devices also include a memory array of the image processing devices arranged to serve as a memory for the processor.

16. An optical image data processor as described in claim 14, wherein the plurality of electronic image processing devices also include a memory array of the image processing devices arranged to serve as a memory for the processor and the predetermined physical arrangement and spacing of the image processing devices is such that the shifter array of the image processing devices is arranged in one row and the memory array of the image processing devices is arranged in another row and the optical means couples the rows of image processing devices in parallel for transferring the optical image therethrough in accordance with the predetermined scheme.

* * * * *